United States Patent
Xu

(10) Patent No.: US 10,948,773 B2
(45) Date of Patent: Mar. 16, 2021

(54) BACKLIGHT MODULE INCLUDING A LIGHT GUIDE PLATE COMPRISING CONCAVE AND CONVEX LENS STRUCTURES, CONTROL METHOD THEREOF AND DISPLAY DEVICE

(71) Applicants: HEFEI BOE OPTOELECTRONICS TECHNOLOGY CO., LTD., Anhui (CN); BOE TECHNOLOGY GROUP CO., LTD., Beijing (CN)

(72) Inventor: Jun Xu, Beijing (CN)

(73) Assignees: HEFEI BOE OPTOELECTRONICS TECHNOLOGY CO., LTD. Anhui, China, Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/387,699

(22) Filed: Apr. 18, 2019

(65) Prior Publication Data
US 2020/0019018 A1    Jan. 16, 2020

(30) Foreign Application Priority Data
Jul. 11, 2018 (CN) .......................... 2018 1 0758836

(51) Int. Cl.
| | | |
|---|---|---|
| G09G 3/36 | (2006.01) | |
| G02F 1/13357 | (2006.01) | |
| F21V 8/00 | (2006.01) | |
| G02F 1/1335 | (2006.01) | |
| G09G 3/32 | (2016.01) | |

(52) U.S. Cl.
CPC ....... *G02F 1/133606* (2013.01); *G02B 6/003* (2013.01); *G02B 6/0068* (2013.01); *G02F 1/133526* (2013.01); *G02F 1/133603* (2013.01); *G09G 3/32* (2013.01)

(58) Field of Classification Search
None
See application file for complete search history.

(56) References Cited

U.S. PATENT DOCUMENTS

| | | | |
|---|---|---|---|
| 2004/0109314 A1* | 6/2004 | Yang | G02B 6/0021 362/245 |
| 2013/0215364 A1* | 8/2013 | Huang | G02B 27/0093 349/69 |
| 2015/0138059 A1* | 5/2015 | Large | H04N 13/32 345/102 |
| 2019/0219874 A1* | 7/2019 | Chang | G02F 1/133603 |

OTHER PUBLICATIONS

Google definition of lens, 2020, www.google.com, p. 1 (Year: 2020).*

* cited by examiner

*Primary Examiner* — Kirk W Hermann
(74) *Attorney, Agent, or Firm* — Calfee, Halter & Griswold LLP

(57) ABSTRACT

A backlight module comprising a plurality of light sources and a light guide plate. The plurality of light sources comprises a plurality of first light sources and a plurality of second light sources. The light guide plate comprises a plurality of concave lens structures and a plurality of convex lens structures on a side of the light guide plate distant from the plurality of light sources. The plurality of concave lens structures and the plurality of convex lens structures correspond to the plurality of first light sources and the plurality of second light sources, respectively. A method for controlling a backlight module and a display device including the backlight module is also provided.

18 Claims, 4 Drawing Sheets

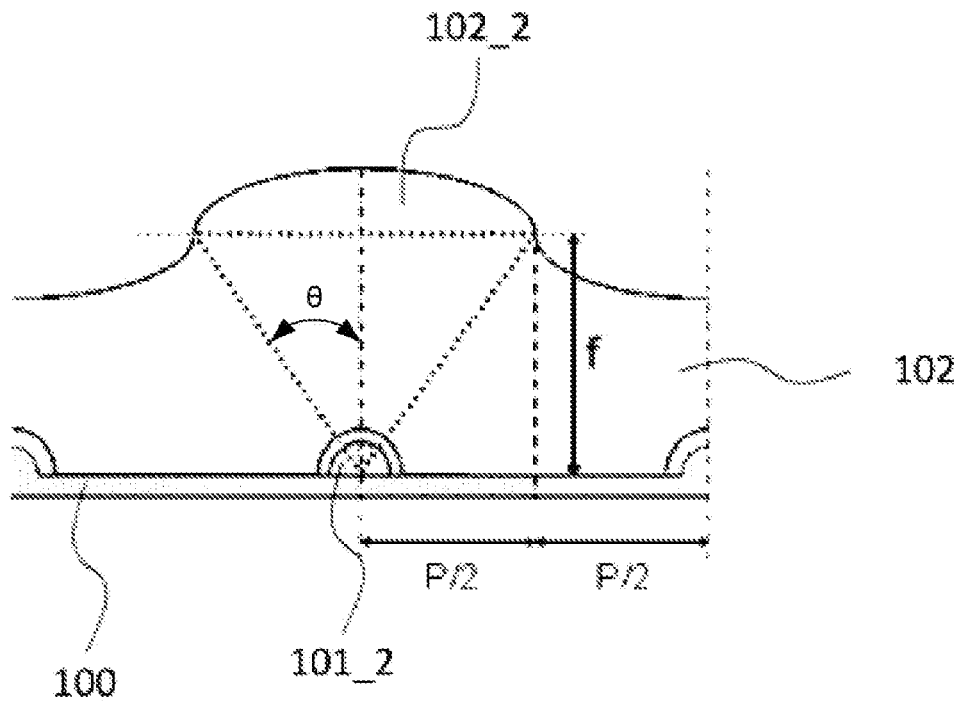

Fig. 5B

| in a first mode of said backlight module, controlling said plurality of first light sources to emit light and controlling said plurality of second light sources to not emit light | — S101 |

↓

| in a second mode of said backlight module, controlling said plurality of first light sources to not emit light and controlling said plurality of second light sources to emit light | — S102 |

Fig. 6

BACKLIGHT MODULE INCLUDING A LIGHT GUIDE PLATE COMPRISING CONCAVE AND CONVEX LENS STRUCTURES, CONTROL METHOD THEREOF AND DISPLAY DEVICE

RELATED ART

The present application claims the benefit of Chinese Patent Application for invention No. 201810758836.6, filed on Jul. 11, 2018, the entire disclosure of which is incorporated herein by reference.

TECHNICAL FIELD

The present disclosure relates to display technology, and particularly relates to a backlight module and control method thereof, and a display device comprising the backlight module.

BACKGROUND

Along with development of display technology, various display devices brings various visual experiences to users. Currently, up to 70% users contact privacy information via electronic products in a variety of public places. Thus, peep-proof display technique for privacy information needs to be developed.

Current Liquid Crystal Display (LCD)-based switchable peep-proof display techniques mainly include two manners: (1) a solution of implementing beam correction based on an electric field change in a panel, two electric field distribution states correspond to a privacy display mode and a normal display mode (i.e. a non-privacy display mode), respectively; (2) a solution based on backlight switching, which can be further divided into a "peep-proof film+Polymer Dispersed Liquid Crystal (PDLC)" scheme and a "double light guide plates (LGP)" scheme.

SUMMARY

The present disclosure provides a backlight module, a method for controlling the backlight module, and a display device comprising the backlight module.

According to an exemplary embodiment of the present disclosure, a backlight module comprising a plurality of light sources and a light guide plate is provided. Said plurality of light sources comprises a plurality of first light sources and a plurality of second light sources. Said light guide plate comprises a plurality of concave lens structures and a plurality of convex lens structures on a side of the light guide plate distant from said plurality of light sources, and said plurality of concave lens structures and said plurality of convex lens structures correspond to said plurality of first light sources and said plurality of second light sources, respectively.

According to an embodiment of the present disclosure, said plurality of concave lens structures and said plurality of convex lens structures may be arranged alternately in both a row direction and a column direction, and said plurality of first light sources and said plurality of second light sources may be arranged alternately in both a row direction and a column direction.

According to an embodiment of the present disclosure, said plurality of concave lens structures may correspond to said plurality of first light sources and each of said plurality of concave lens structures may make light emitted from a corresponding first light source pass through said concave lens structure and exit from said backlight module at a first beam angle; and wherein said plurality of convex lens structures may correspond to said plurality of second light sources and each of said convex lens structures may make light emitted from a corresponding second light source pass through said convex lens structure and exit from said backlight module at a second beam angle smaller than said first beam angle.

According to an embodiment of the present disclosure, each of said convex lens structures may make light emitted from a corresponding second light source pass through said convex lens structure and exit from said backlight module in a direction substantially perpendicular with said light guide plate.

According to an embodiment of the present disclosure, said light guide plate has a plurality of grooves for accommodating said plurality of light sources on a side of the light guide plate facing said plurality of light sources.

According to an embodiment of the present disclosure, said plurality of convex lens structures may correspond to said plurality of second light sources and each of said second light sources is disposed at a focus position of a corresponding convex lens structure.

According to an embodiment of the present disclosure, the backlight module may further comprise a controller. Said controller can be connected to said plurality of first light sources via a first control line to control said plurality of first light sources to emit light or not emit light, and said controller can be connected to said plurality of second light sources via a second control line to control said plurality of second light sources to emit light or not emit light.

According to an embodiment of the present disclosure, in a first mode of said backlight module, said controller may control said plurality of first light sources to emit light and control said plurality of second light sources to not emit light, and in a second mode of said backlight module, said controller may control said plurality of first light sources to not emit light and control said plurality of second light sources to emit light.

According to an embodiment of the present disclosure, said plurality of light sources comprises at least one of LED, microLED and miniLED.

According to another exemplary embodiment of the present disclosure, a method for controlling a backlight module is provided, said backlight module comprises a plurality of light sources and a light guide plate, said plurality of light sources comprise a plurality of first light sources and a plurality of second light sources, said backlight module further comprises a controller, said controller is connected to said plurality of first light sources via a first control line and is connected to said plurality of second light sources via a second control line, said light guide plate comprises a plurality of concave lens structures and a plurality of convex lens structures on a side of the light guide plate distant from said plurality of light sources, and said plurality of concave lens structures and said plurality of convex lens structures correspond to said plurality of first light sources and said plurality of second light sources, respectively, said method comprises: in a first mode of said backlight module, said controller controlling said plurality of first light sources to emit light and controlling said plurality of second light sources to not emit light, and in a second mode of said backlight module, said controller controlling said plurality of first light sources to not emit light and controlling said plurality of second light sources to emit light.

According to an embodiment of the present disclosure, said plurality of concave lens structures may correspond to said plurality of first light sources and in a first mode of said backlight module, said controller controls said plurality of first light sources to emit light, wherein each of said plurality of concave lens structures may make light emitted from a corresponding first light source pass through said concave lens structure and exit from said backlight module at a first beam angle; and wherein said plurality of convex lens structures may correspond to said plurality of second light sources and in a second mode of said backlight module, said controller controls said plurality of second light sources to emit light, each of said convex lens structures may make light emitted from a corresponding second light source pass through said convex lens structure and exit from said backlight module at a second beam angle smaller than said first beam angle.

According to an embodiment of the present disclosure, each of said second light sources may be disposed at a focus position of a corresponding convex lens structure, and each of said convex lens structures may make light emitted from a corresponding second light source pass through said convex lens structure and exit from said backlight module in a direction substantially perpendicular with said light guide plate.

According to another exemplary embodiment of the present disclosure, a display device is provided, comprising a backlight module according to the present disclosure and a display panel.

DESCRIPTION OF THE DRAWINGS

Embodiments of the present disclosure can be understood more clearly in combination with the following detailed descriptions of the figures, in the drawings:

FIGS. 5A and 5B are local enlarged views of region A in FIG. 2;

FIG. 6 is an illustrative flow chart of a method for controlling a backlight module according to an embodiment of the present disclosure.

EMBODIMENTS

Current LCD-based switchable peep-proof display techniques mainly include two manners: a solution of implementing beam correction based on an electric field change in a panel and a solution based on backlight switching. The solution based on backlight switching can be further divided into a "peep-proof film+Polymer Dispersed Liquid Crystal (PDLC)" scheme and a "double light guide plates (LGP)" scheme. The solution based on an electric field change in a panel is relatively complex, it may affect a displayed picture, and has a limited peep-proof effect. In a "peep-proof film+ Polymer Dispersed Liquid Crystal (PDLC)" scheme, a commonly used arrangement manner includes a backlight module emitting parallel light and dimming devices such as PDLC. This implementing manner ensures parallel light exit by absorbing light in non-parallel directions, which has great light loss and results in brightness loss. Besides, in a "peep-proof film+Polymer Dispersed Liquid Crystal (PDLC)" scheme, since PDLC and a peep-proof film are used simultaneously, the thickness will increase and cost is high. Further, driving a PDLC will increase power consumption and structure complexity. A "double light guide plates (LGP)" scheme also has the defects of a high cost, a large thickness and a complex structure.

Figure 1:
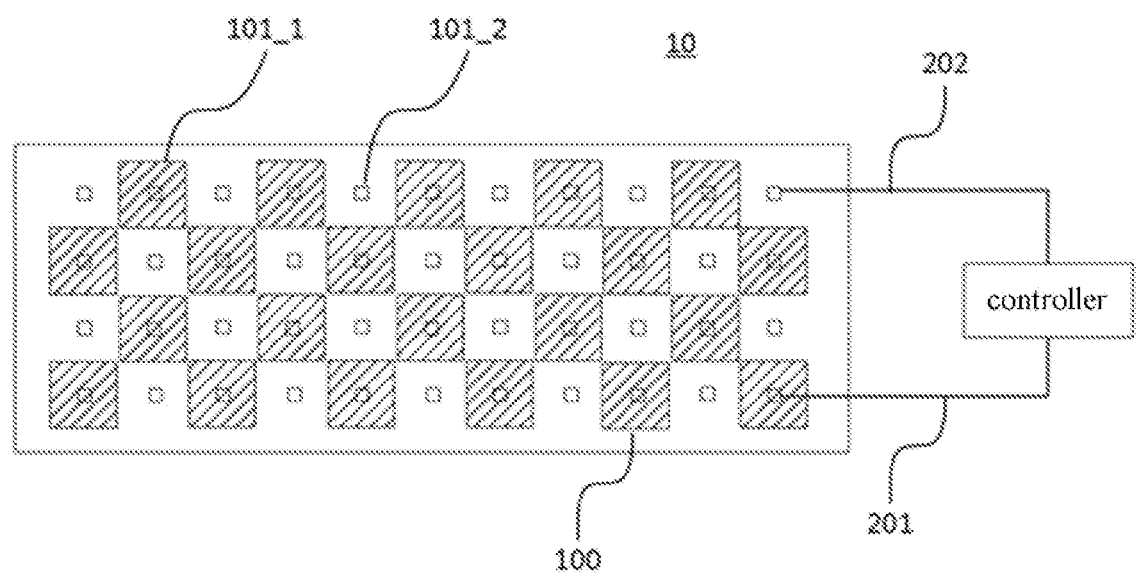
FIG. 1 is an illustrative top view of a backlight module according to an embodiment of the present disclosure.
Figure 2:
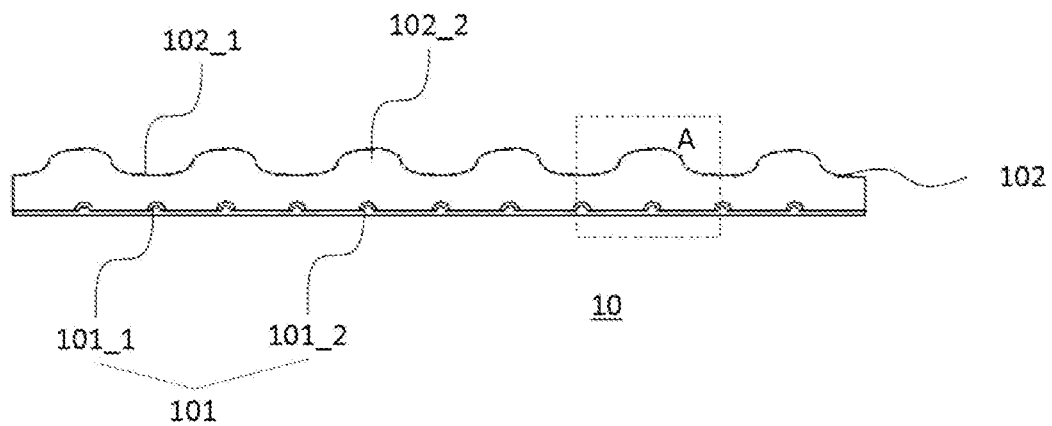
FIG. 2 is an illustrative section view of a backlight module according to an embodiment of the present disclosure.

FIG. 1 is an illustrative top view of a backlight module 10 according to an embodiment of the present disclosure, and FIG. 2 is an illustrative section view of a backlight module 10 according to an embodiment of the present disclosure.

As shown in FIG. 1 and FIG. 2, a backlight module 10 according to an embodiment of the present disclosure may comprise a plurality of light sources 101 and a light guide plate 102. The plurality of light sources 101 may comprise a plurality of first light sources 101_1 and a plurality of second light sources 101_2. The light guide plate 102 has a plurality of concave lens structures 102_1 and a plurality of convex lens structures 102_2 on a side of the light guide plate distant from said plurality of light sources 101. Said plurality of concave lens structures 102_1 and said plurality of convex lens structures 102_2 correspond to said plurality of first light sources 101_1 and said plurality of second light sources 101_2, respectively. The backlight module 10 according to an embodiment of the present disclosure may be a direct backlight module.

According to an embodiment of the present disclosure, said plurality of light sources 101 comprises at least one of LED, microLED and miniLED.

MicroLED (also called mLED or μLED) displays have been under attention for their higher brightness and resolution and longer service life. A microLED display is composed of microLED arrays that form different pixel elements. As compared with the widely used LED technology, a microLED display can provide better contrast, faster response time and smaller power consumption. Similar to Organic Light Emitting Diode (OLED), the power consumption of OLED and microLED is significantly reduced as compared with the traditional LED. However, different from OLED, microLED is based on the traditional GaN LED technology, which provides a total brightness much greater than the brightness produced by OLED, even as much as 30 times. Besides, it has better performance in power efficiency and has a longer service life. A miniLED (also called submillimeter LED) refers to a LED having a crystalline grain size of above 100 microns. A miniLED is between a traditional LED and a microLED. To put it simply, a miniLED is an improved version of a traditional LED backlight. In terms of structural principle, microLED is simpler, but miniaturization of LED requires a wafer level technology. In terms of manufacturing process, miniLED has higher yield and special-shaped cutting characteristics as compared with microLED. The advantages of microLED lie in the characteristics of high efficiency, high brightness, high reliability and fast response time inherited from LED and achieving an effect of power saving with a small volume, small thickness and weight. miniLEDs are mainly applied in backlight sources in a High-Dynamic Range (HDR) or special-shaped displays, etc.

According to an embodiment of the present disclosure, the light guide plate may be made of a transparent material, including but not limited to glass, polymethyl methacrylate (PMMA), polyethersulfone (PES), or polycarbonate (PC).

As shown in FIG. 1, according to an embodiment of the present disclosure, a plurality of concave lens structures 102_1 and a plurality of convex lens structures 102_2 can be arranged alternately in both a row direction and a column direction, and said plurality of first light sources 101_1 and said plurality of second light sources 101_2 can be arranged alternately in both a row direction and a column direction, such that said plurality of concave lens structures 102_1 can correspond to said plurality of first light sources 101_1 and said plurality of convex lens structures 102_2 can correspond to said plurality of second light sources 101_2. According to an embodiment of the present disclosure, in the top view shown in FIG. 1, said plurality of first light sources 101_1 and said plurality of second light sources 101_2 can be arranged in a central region of said plurality of concave lens structures 102_1 and said plurality of convex lens structures 102_2, respectively. Light emitted by the plurality of first light sources 101_1 exits after being adjusted by the plurality of concave lens structures 102_1, which perform a diverging function to light passing therethrough. Light emitted by the plurality of second light sources 101_2 exits after being adjusted by the plurality of convex lens structures 102_2, which perform a converging function to light passing therethrough.

Figure 3:
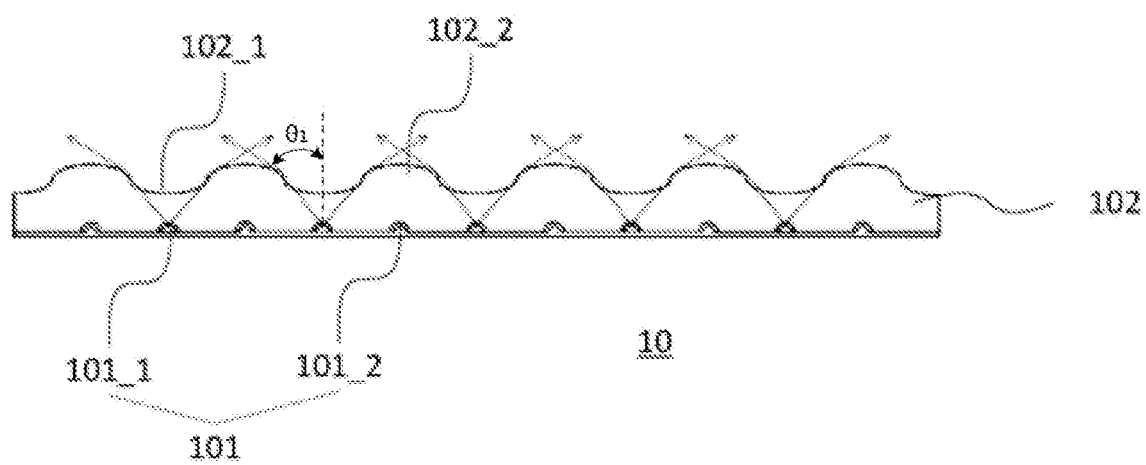
FIG. 3 is an illustrative diagram of a backlight module emitting backlight in a first mode according to an embodiment of the present disclosure.
Figure 4A:
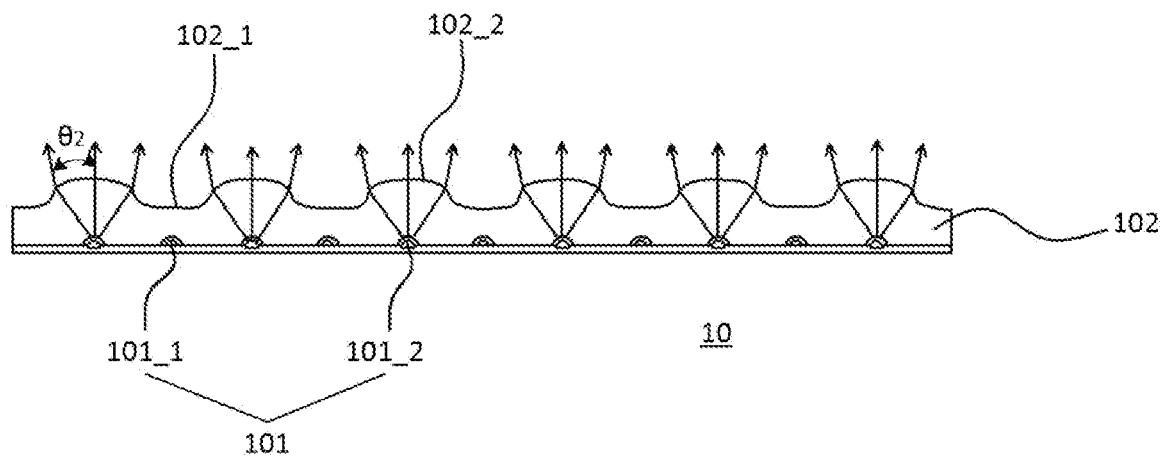
FIGS. 4A and 4B are illustrative diagrams of a backlight module emitting backlight in a second mode according to an embodiment of the present disclosure.
Figure 4B:
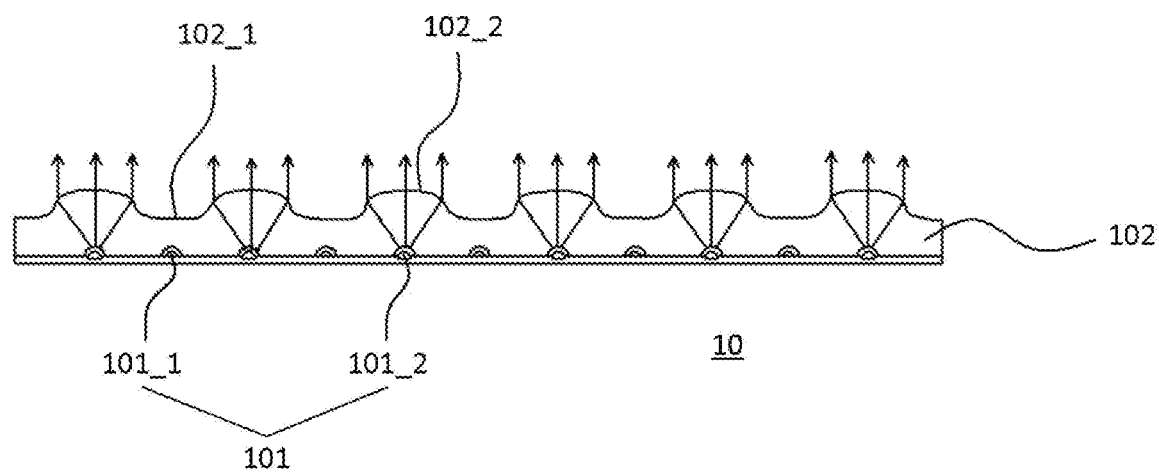

FIG. 3 is an illustrative diagram of a backlight module emitting backlight in a first mode according to an embodiment of the present disclosure, and FIGS. 4A and 4B are illustrative diagrams of a backlight module emitting backlight in a second mode according to an embodiment of the present disclosure.

As shown in FIG. 3, said backlight module 10, when operating in a first mode (a normal display mode or a non-privacy display mode), controls said plurality of first light sources 101_1 to emit light and each of said concave lens structures 102_1 makes light emitted from a corresponding first light source 101_1 pass through said concave lens structure 102_1 and then exit from said backlight module 10 at a first beam angle θ1.

As shown in FIG. 4A and FIG. 4B, said backlight module 10, when operating in a second mode (i.e. a privacy display mode), controls said plurality of second light sources 101_2 to emit light, and each of said convex lens structures 102_2 makes light emitted from a corresponding second light source 101_2 pass through said convex lens structure 102_2 and exit from said backlight module 10 at a second beam angle θ2 smaller than said first beam angle θ1. Furthermore, each of said convex lens structures 102_2 makes light emitted from a corresponding second light source 101_2 pass through said convex lens structure 102_2 and exit from said backlight module 10 in a direction substantially perpendicular with said light guide plate 102.

Back to FIG. 1, according to an embodiment of the present disclosure, the backlight module 10 may further comprise a controller 200. The controller 200 can be connected to said plurality of first light sources 101_1 via a first control line 201 to control said plurality of first light sources 101_1 to emit light or not emit light. Said controller 200 can be further connected to said plurality of second light sources 101_2 via a second control line 202 to control said plurality of second light sources 101_2 to emit light or not emit light. In a first mode (i.e. a normal display mode or a non-privacy display mode) of said backlight module 10, said controller 200 can control said plurality of first light sources 101_1 to emit light and control said plurality of second light sources 101_2 to not emit light; in a second mode (i.e. a privacy display mode) of said backlight module 10, said controller 200 can control said plurality of first light sources 101_1 to not emit light and control said plurality of second light sources 101_2 to emit light. Although the figure shows that the controller 200 is connected to one first light source 101_1 and one second light source 101_2 via the first control line 201 and the second control line 202, respectively, it should be understood that this is only illustrative, and the controller 200 can be connected to the respective first light sources 101_1 in the backlight module 10 via the first control line 201 and connected to the respective second light sources 101_2 in the backlight module 10 via the second control line 202. Besides, according to the embodiment disclosed in the present disclosure, the first control line 201 and the second control line 202 may include a plurality of sub-control lines respectively and the controller 200 can be connected to the respective first light sources 101_1 and the respective second light sources 101_2 via the sub-control lines respectively to perform group control to the first light sources 101_1 and the second light sources 101_2, respectively.

Although it is described in the above embodiment and shown in FIG. 3 that the controller 200 can control said plurality of first light sources 101_1 to emit light and control said plurality of second light sources 101_2 to not emit light in a normal display mode or a non-privacy display mode. However, the present disclosure is not limited thereto. In a normal display mode or a non-privacy display mode, the controller 200 may control said plurality of first light sources 101_1 and said plurality of second light sources 101_2 to emit light.

Although FIG. 1 shows the backlight module is provided with an equal number of first light sources and second light sources, the present disclosure is not limited thereto. The number of the first light sources can be larger or smaller than the number of the second light sources according to the requirement.

Figure 5A:
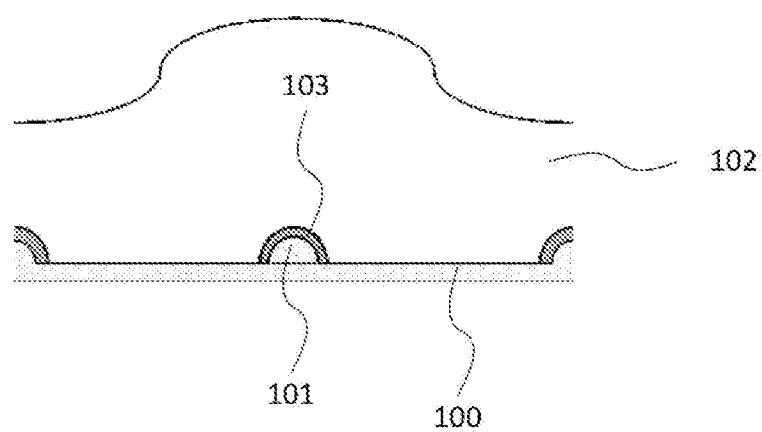

FIGS. 5A and 5B are local enlarged views of region A in FIG. 2.

Refer to FIG. 5A, a plurality of light sources 101 can be disposed on a substrate 100, which can be a flexible printed circuit board (FPC). A reflector plate (not shown) can be disposed on a side of the substrate 100 opposite to the side, on which light sources 101 are disposed, to enhance light emission efficiency.

The light guide plate 102 can be assembled with the substrate 100 provided with a plurality of light sources 101 to form a backlight module 10. As shown in FIG. 5, grooves can be provided at positions in the light guide plate 102 corresponding to the respective light sources 101 to accommodate the light sources 101. An optically clear adhesive (OCA) 103 can be provided between the light sources 101 and the light guide plate 102. The optically clear adhesive (OCA) 103 is selected with its refractive index taken into consideration. An isotropic optically clear adhesive having a refractive index close to the refractive index of the light guide plate 102 can be selected.

Refer to FIG. 5B, which specifically illustrates second light sources 101_2 disposed on the substrate 100 and convex lens structure 102_2 corresponding to the second light sources 101_2. A beam angle θ of each light source 101 (including a first light source 101_1 and a second light source 101_2) is a known process parameter (which can be understood as an angle formed between an edge light of the output light and the optical axis). The purpose of the present disclosure lies in: in a normal display mode, a first light source 101_1 corresponding to the concave lens structure 102_1 emits light such that light exits at a relatively large beam angle θ1 (see FIG. 3) larger than the beam angle θ, and in a privacy display mode, a second light source 101_2 corresponding to the convex lens structure 102_2 emits light such that light exits at a relatively small beam angle θ2 (see FIG. 4) smaller than the beam angle θ, in this way, switching between a normal display mode and a privacy display mode can be realized by lighting different light sources in the backlight module in different display modes. As shown in FIG. 5B, a distance P between adjacent light sources 101 can be calculated based on a beam angle θ of the light source 101 (i.e. a second light source 101_2) and a desired thickness of the backlight module (which is directly correlated to a focal distance f of the convex lens structure 102_2), that is, according to $$\tan\theta = \frac{f}{P/2},$$

it can be obtained that $$P = \frac{2f}{\tan\theta}$$

FIG. 6 is an illustrative flow chart of a method for controlling a backlight module according to an embodiment of the present disclosure.

A method for controlling a backlight module according to an embodiment of the present disclosure can be used to control a backlight module according to the present disclosure. As shown in FIG. 6, said control method may comprise steps S101 and S102.

At step S101, in a first mode of said backlight module, controlling said plurality of first light sources to emit light and controlling said plurality of second light sources to not emit light.

At step S102, in a second mode of said backlight module, controlling said plurality of first light sources to not emit light and controlling said plurality of second light sources to emit light.

Refer to FIG. 1, FIG. 3 and FIG. 6, according to an embodiment of the present disclosure, the first mode can be a normal display mode or a non-privacy display mode, wherein the plurality of first light sources 101_1 emit light under the control of a controller 200, and the plurality of second light sources 101_2 do not emit light under the control of the controller 200. In the first mode, when the controller 200 controls the plurality of first light sources 101_1 to emit light, each of said concave lens structures 102_1 makes light emitted from a corresponding first light source 101_1 pass through said concave lens structure 102_1 and then exit from said backlight module 10 at a first beam angle θ1.

Refer to FIG. 1, FIG. 4 and FIG. 6, according to an embodiment of the present disclosure, the second mode can be a privacy display mode, wherein the plurality of first light sources 101_1 do not emit light under the control of a controller 200, and the plurality of second light sources 101_2 emit light under the control of the controller 200. In the second mode, when the controller 200 controls the plurality of second light sources 101_2 to emit light, each of said convex lens structures 102_2 makes light emitted from a corresponding second light source 101_2 pass through said convex lens structure 102_2 and exit from said backlight module 10 at a second beam angle θ2 smaller than said first beam angle θ1.

Although it is described in the above embodiment that in a normal display mode or a non-privacy display mode, the plurality of first light sources 101_1 emit light under the control of a controller 200, and the plurality of second light sources 101_2 do not emit light under the control of the controller 200. However, the present disclosure is not limited thereto. In a normal display mode or a non-privacy display mode, the controller 200 may control said plurality of first light sources 101_1 and said plurality of second light sources 101_2 to both emit light.

Figure 7A:
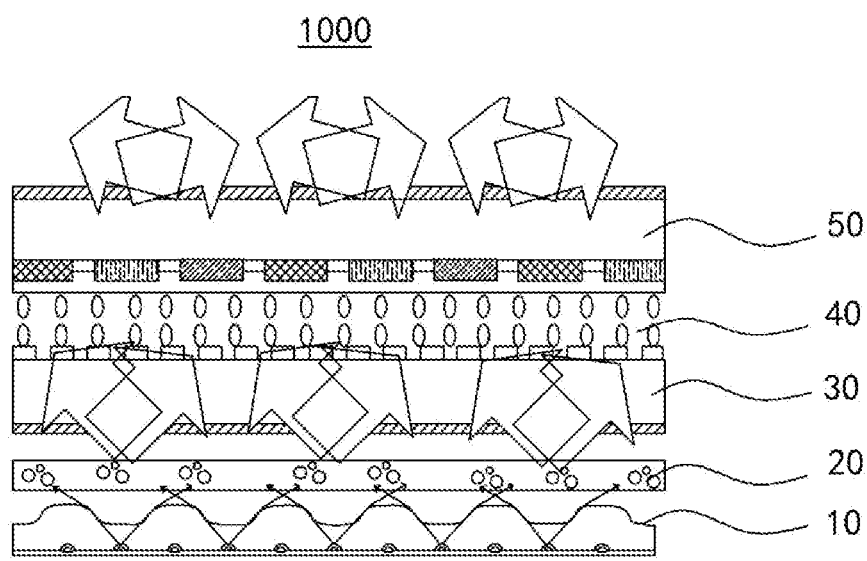
FIGS. 7A and 7B are illustrative cross-sectional views of a liquid crystal display device according to an embodiment of the present disclosure.
Figure 7B:
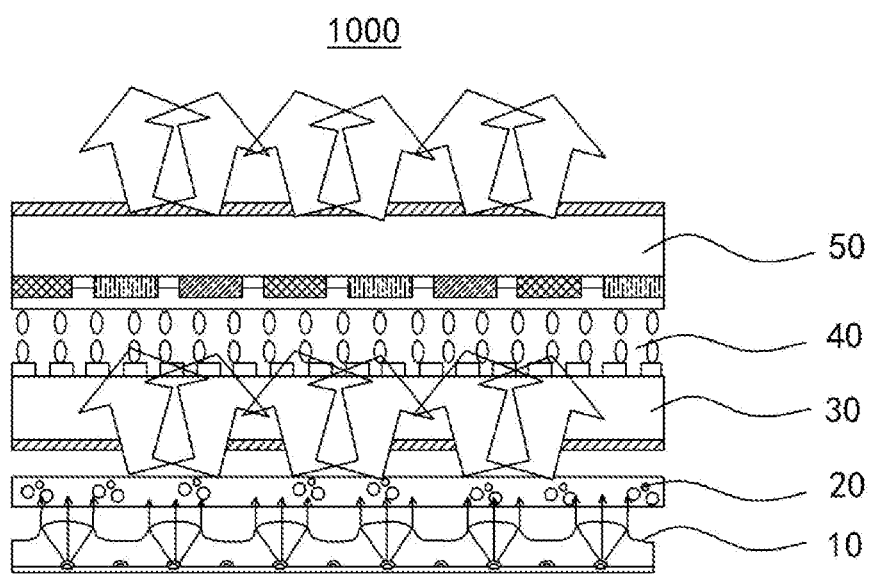

FIGS. 7A and 7B are illustrative cross-sectional views of a liquid crystal display device 1000 according to an embodiment of the present disclosure.

As shown in FIGS. 7A and 7B, a liquid crystal display device 1000 according to an embodiment of the present disclosure may comprise a backlight module 10 according to an embodiment of the present disclosure as depicted in FIG. 1-FIG. 5. Besides, a liquid crystal display device 1000 according to an embodiment of the present disclosure may further comprise a diffusion plate 20, an array substrate 30, a liquid crystal layer 40 and a color film substrate 50. The array substrate 30 can be provided with a down polarizer on a side thereof close to the backlight module 10 and provided with pixel electrodes on a side thereof distant from the backlight module 10. The color film substrate 50 is provided with a color filter and a black matrix on a side thereof close to the backlight module 10 and provided with an up polarizer on a side thereof distant from the backlight module 10.

FIG. 7A shows the effect of light exiting from the backlight module 10 in a normal display mode or a non-privacy display mode, and FIG. 7B shows the effect of light exiting from the backlight module 10 in a privacy display mode.

A liquid crystal display device according to the present disclosure may include (but not limited to) a liquid crystal display, a portable computer, a netbook, a personal digital assistant (PDA), a network panel, a mobile phone, a smart phone, an electronic book, a portable multimedia player (PMP), a digital camera, a digital audio recorder/player, a digital picture/video recorder/player, a portable game machine.

With reference to the principle of the present disclosure described in the embodiments of the present disclosure, it should be understood that the arrangement manner and details of the embodiments described herein can be modified and combined in any desired manner without deviating from the principle. Although the above discussion focuses on particular embodiments, other constructions are also considered. Specifically, even if expressions such as "according to an embodiment of the present disclosure" is used in the present disclosure, these phrases generally refer to any possible embodiment rather than aiming to limit the concept of the present disclosure to particular constructions. As used in the present disclosure, these terms can be cited in other embodiments including a combination of the same or different embodiments.

Although the concept of the present disclosure is particularly illustrated and described with reference to some embodiments of the present disclosure, it should be understood that various modifications in form and detail can be made without deviating from the spirit and scopes of the claims.

The invention claimed is:

1. A backlight module, comprising a plurality of light sources and a light guide plate, wherein said plurality of light sources comprise a plurality of first light sources and a plurality of second light sources, said light guide plate comprises a plurality of concave lens structures and a plurality of convex lens structures on a side of the light guide plate distant from said plurality of light sources, and said plurality of concave lens structures and said plurality of convex lens structures correspond to said plurality of first light sources and said plurality of second light sources, respectively, wherein said plurality of concave lens structures and said plurality of convex lens structures are arranged alternately in both a row direction and a column direction, and said plurality of first light sources and said plurality of second light sources are arranged alternately in both a row direction and a column direction.

2. The backlight module according to claim 1, wherein said plurality of concave lens structures correspond to said plurality of first light sources and each of said plurality of concave lens structures makes light emitted from a corresponding first light source pass through said concave lens structure and exit from said backlight module at a first beam angle; and said plurality of convex lens structures correspond to said plurality of second light sources and each of said convex lens structures makes light emitted from a corresponding second light source pass through said convex lens structure and exit from said backlight module at a second beam angle smaller than said first beam angle.

3. The backlight module according to claim 2, wherein each of said convex lens structures makes light emitted from a corresponding second light source pass through said convex lens structure and exit from said backlight module in a direction substantially perpendicular with said light guide plate.

4. The backlight module according to claim 1, wherein said light guide plate has a plurality of grooves for accommodating said plurality of light sources on a side of the light guide plate facing said plurality of light sources.

5. The backlight module according to claim 4, wherein said plurality of convex lens structures correspond to said plurality of second light sources and each of said second light sources is disposed at a focus position of a corresponding convex lens structure.

6. The backlight module according to claim 1, further comprising a controller, wherein said controller is connected to said plurality of first light sources via a first control line to control said plurality of first light sources to emit light or not emit light, and said controller is connected to said plurality of second light sources via a second control line to control said plurality of second light sources to emit light or not emit light.

7. The backlight module according to claim 6, wherein in a first mode of said backlight module, said controller controls said plurality of first light sources to emit light and controls said plurality of second light sources to not emit light, and in a second mode of said backlight module, said controller controls said plurality of first light sources to not emit light and controls said plurality of second light sources to emit light.

8. The backlight module according to claim 1, wherein said plurality of light sources comprises at least one of LED, microLED and miniLED.

9. A display device, comprising said backlight module according to claim 1 and a display panel.

10. The display device according to claim 9, wherein said plurality of concave lens structures correspond to said plurality of first light sources and each of said plurality of concave lens structures makes light emitted from a corresponding first light source pass through said concave lens structure and exit from said backlight module at a first beam angle; and said plurality of convex lens structures correspond to said plurality of second light sources and each of said convex lens structures makes light emitted from a corresponding second light source pass through said convex lens structure and exit from said backlight module at a second beam angle smaller than said first beam angle.

11. The display device according to claim 10, wherein each of said convex lens structures makes light emitted from a corresponding second light source pass through said convex lens structure and exit from said backlight module in a direction substantially perpendicular with said light guide plate.

12. The display device according to claim 9, wherein said light guide plate has a plurality of grooves for accommodating said plurality of light sources on a side of the light guide plate facing said plurality of light sources.

13. The display device according to claim 12, wherein said plurality of convex lens structures correspond to said plurality of second light sources and each of said second light sources is disposed at a focus position of a corresponding convex lens structure.

14. The display device according to claim 9, further comprising a controller, wherein said controller is connected to said plurality of first light sources via a first control line to control said plurality of first light sources to emit light or not emit light, and said controller is connected to said plurality of second light sources via a second control line to control said plurality of second light sources to emit light or not emit light.

15. The display device according to claim 14, wherein in a first mode of said backlight module, said controller controls said plurality of first light sources to emit light and controls said plurality of second light sources to not emit light, and in a second mode of said backlight module, said controller controls said plurality of first light sources to not emit light and controls said plurality of second light sources to emit light.

16. A method for controlling a backlight module, said backlight module comprising a plurality of light sources and a light guide plate, said plurality of light sources comprising a plurality of first light sources and a plurality of second light sources, said backlight module further comprising a controller, said controller being connected to said plurality of first light sources via a first control line and connected to said plurality of second light sources via a second control line, said light guide plate comprising a plurality of concave lens structures and a plurality of convex lens structures on a side of the light guide plate distant from said plurality of light sources, and said plurality of concave lens structures and said plurality of convex lens structures corresponding to said plurality of first light sources and said plurality of second light sources, respectively, wherein said plurality of concave lens structures and said plurality of convex lens structures are arranged alternately in both a row direction and a column direction, and said plurality of first light sources and said plurality of second light sources are arranged alternately in both a row direction and a column direction, said method comprises:

in a first mode of said backlight module, said controller controlling said plurality of first light sources to emit light and controlling said plurality of second light sources to not emit light, and in a second mode of said backlight module, said controller controlling said plurality of first light sources to not emit light and controlling said plurality of second light sources to emit light.

17. The method for controlling a backlight module according to claim 16, wherein said plurality of concave lens structures correspond to said plurality of first light sources and in a first mode of said backlight module, said controller controls said plurality of first light sources to emit light, each of said plurality of concave lens structures makes light emitted from a corresponding first light source pass through said concave lens structure and exit from said backlight module at a first beam angle; and wherein said plurality of convex lens structures correspond to said plurality of second light sources and in a second mode of said backlight module, said controller controls said plurality of second light sources to emit light, each of said convex lens structures makes light emitted from a corresponding second light source pass through said convex lens structure and exit from said backlight module at a second beam angle smaller than said first beam angle.

18. The method for controlling a backlight module according to claim 17, wherein each of said second light sources is disposed at a focus position of a corresponding convex lens structure, and each of said convex lens structures makes light emitted from a corresponding second light source pass through said convex lens structure and exit from said backlight module in a direction substantially perpendicular with said light guide plate.

* * * * *

UNITED STATES PATENT AND TRADEMARK OFFICE
CERTIFICATE OF CORRECTION

PATENT NO. : 10,948,773 B2
APPLICATION NO. : 16/387699
DATED : March 16, 2021
INVENTOR(S) : Jun Xu Page 1 of 1

It is certified that error appears in the above-identified patent and that said Letters Patent is hereby corrected as shown below:

On the Title Page

Item [73], insert:
--HEFEI BOE OPTOELECTRONICS TECHNOLOGY CO., LTD., Anhui (CN)
BOE TECHNOLOGY GROUP CO., LTD., Beijing (CN)--

Signed and Sealed this
Eighth Day of June, 2021

Drew Hirshfeld
*Performing the Functions and Duties of the
Under Secretary of Commerce for Intellectual Property and
Director of the United States Patent and Trademark Office*